(12) United States Patent
Zeiser et al.

(10) Patent No.: US 12,327,896 B2
(45) Date of Patent: Jun. 10, 2025

(54) FUEL CELL SYSTEM HAVING A VALVE IN A VALVE HOUSING AND A METHOD FOR CONTROLLING A FLOW OF A FLUID

(71) Applicant: Robert Bosch GmbH, Stuttgart (DE)

(72) Inventors: Janis Zeiser, Schwieberdingen (DE); Dirk Schnittger, Ludwigsburg (DE); Friedrich Howey, Ditzingen (DE)

(73) Assignee: Robert Bosch GmbH, Stuttgart (DE)

(*) Notice: Subject to any disclaimer, the term of this patent is extended or adjusted under 35 U.S.C. 154(b) by 608 days.

(21) Appl. No.: 17/776,030

(22) PCT Filed: Oct. 30, 2020

(86) PCT No.: PCT/EP2020/080497
§ 371 (c)(1),
(2) Date: May 11, 2022

(87) PCT Pub. No.: WO2021/094104
PCT Pub. Date: May 20, 2021

(65) Prior Publication Data
US 2022/0384828 A1  Dec. 1, 2022

(30) Foreign Application Priority Data

Nov. 13, 2019 (DE) ............... 10 2019 217 483.3

(51) Int. Cl.
*H01M 8/04746* (2016.01)
*F16K 39/02* (2006.01)
*H01M 8/04089* (2016.01)

(52) U.S. Cl.
CPC ....... *H01M 8/04753* (2013.01); *F16K 39/024* (2013.01); *H01M 8/04089* (2013.01)

(58) Field of Classification Search
CPC ........... F16K 39/024; H01M 8/04089; H01M 8/04225; H01M 8/04302; H01M 8/04753; H01M 8/04761; Y02E 60/50
See application file for complete search history.

(56) References Cited

U.S. PATENT DOCUMENTS

2012/0061600 A1  3/2012 Neff et al.

FOREIGN PATENT DOCUMENTS

| CN | 1070377 A | 3/1993 |
|---|---|---|
| DE | 1046969 B | 12/1958 |

(Continued)

OTHER PUBLICATIONS

Machine translation JP2011064245A (Year: 2011).*
Translation of International Search Report for Application No. PCT/EP2020/080497 dated Feb. 1, 2021 (2 pages).

*Primary Examiner* — Victoria H Lynch
(74) *Attorney, Agent, or Firm* — Michael Best & Friedrich LLP (57) ABSTRACT

The invention relates to a fuel cell system (200) having a valve (10) in a valve housing (50), the valve (10) having: a) a drive unit (12), b) an elongate rotor (20) with a first rotor section (21) and a second rotor section (22), the second rotor section (22) having: I. a first radially circumferential projection (31), II. a second radial projection (36), which is spaced at a distance (d1) from the first radially circumferential projection (31) and has at least one opening (39) for the passage of the fluid of the fluid source (102), c) a main valve plate (60) which is movably mounted on the second rotor section (22) and has a rotor hole (62).

16 Claims, 6 Drawing Sheets

(56) References Cited

FOREIGN PATENT DOCUMENTS

| EP | 2966324 A1 | 1/2016 |
|----|------------|--------|
| JP | 2011064245 A | 3/2011 |

\* cited by examiner

FUEL CELL SYSTEM HAVING A VALVE IN A VALVE HOUSING AND A METHOD FOR CONTROLLING A FLOW OF A FLUID

BACKGROUND

A fuel cell is an electrochemical cell, this cell having two electrodes which are separated from one another by means of an ion-conducting electrolyte. The fuel cell converts the energy of a chemical reaction of a fuel with an oxidizing agent directly into electricity. A fuel cell has an anode and a cathode. There are different types of fuel cells.

One specific type of fuel cell is the polymer electrolyte membrane fuel cell (PEM-FC). In a PEM-FC, two porous electrodes with a catalyst layer adjoin a polymer electrolyte membrane (PEM). Furthermore, the PEM-FC comprises gas diffusion layers which delimit the PEM and the two porous electrodes with a catalyst layer on both sides. The polymer electrolyte membrane, the two electrodes with the catalyst layer and the two gas diffusion layers form what is referred to as a membrane electrode assembly (MEA). Bipolar plates in turn delimit the MEA on both sides. A fuel cell stack is constructed from MEA and bipolar plates arranged alternately one above the other. Distribution of the fuel, in particular hydrogen, takes place on an anode side of a bipolar plate, and distribution of the oxidizing agent, in particular air/oxygen, takes place on a cathode side of the bipolar plate. During the operation of a fuel cell, protonated hydrogen molecules migrate through the membrane from the anode side to the cathode side. On the cathode side, oxygen molecules are reduced and these combine with the protonated hydrogen molecules to form water molecules.

In the initial state, both the anode and the cathode of the fuel cell are filled with air. In the initial state, air can flow via the polymer electrolyte membrane to the anode of the fuel cell. This represents what is referred to as an air/air start, which can be harmful to the fuel cell. To start the fuel cell, hydrogen is passed into the air-filled anode. During this process, there is briefly a state in which a front part of the anode is supplied with hydrogen, while air is present in a rear part of the anode (H2/O2 gas front). As a result, high potential differences can occur between the cathode and the electrolyte. These potential differences lead to carbon corrosion in the catalyst layer of the cathode. This process, referred to as degradation, continues as long as the H2/O2 gas front is moving through the anode.

In order to reduce the transfer of air/oxygen from the cathode to the anode of the fuel cell, valves can be used in supply lines, in particular in cathode gas supply lines for supplying the cathode of the fuel cell with cathode gas, of the fuel cell system. These valves should be capable of being switched from a closed position to an open position in the shortest possible time, thus ensuring that the fuel cell does not suffer any damage due to temporary local differences in a gas in a fuel cell.

SUMMARY

The present invention shows a fuel cell system having a valve in a valve housing.

Here, features and details which are described in connection with the fuel cell system according to the invention also apply, of course, in connection with the method according to the invention and vice versa in each case, and therefore reciprocal reference is or may always be made in respect of the disclosure relating to the individual aspects of the invention.

According to a first aspect, the present invention shows a fuel cell system having a fuel cell stack, wherein the fuel cell stack has a plurality of fuel cells. The fuel cell system also has a valve housing for fluid-communicating connection of a fluid source to the fuel cell stack, wherein a valve for controlling a flow of a fluid from the fluid source into or out of the fuel cell stack is arranged in the valve housing. The valve has:

a) a drive unit, which is configured to be driven by a control unit in order to move an elongate slide of the valve along an axial axis of the elongate slide,
b) the elongate slide with a first slide section and a second slide section, which is arranged on the first slide section, wherein the second slide section comprises:
   i. a first radially encircling projection,
   ii. a second radial projection, which is spaced at a distance from the first radially encircling projection and has at least one aperture for the passage of the fluid from the fluid source,
   iii. a main valve plate, which is mounted movably on the second slide section between the first radially encircling projection and the second radial projection and has a slide hole, wherein the main valve plate has a thickness which is less than the distance between the first radially encircling projection and the second radial projection.

The drive unit can be activated by the control device in order to move the valve into at least one of the following positions by moving the elongate slide of the valve along the axial axis:

1) into a closed position, in which, in particular, the first radially encircling sealing surface section of the main valve plate is pressed against the radially encircling sealing surface counter-section of the first radially encircling projection, and the second radially encircling sealing surface section of the main valve plate is pressed against the radially encircling sealing surface counter-section of the valve housing, with the result that the flow of the fluid from the fluid source, in particular into the fuel cell stack, is interrupted,
2) into a pressure compensating position, in which, in particular, the radially encircling sealing surface counter-section of the first radially encircling projection is released from the first radially encircling sealing surface section of the main valve plate, thus allowing a flow of the fluid from the fluid source, in particular into the fuel cell stack, through a gap between the first radially encircling projection and the main valve plate and enabling a possible pressure difference between the two sides of the valve to be reduced,
3) into an open position, in which, in particular, the radially encircling sealing surface counter-section of the first radially encircling projection is further released from the first radially encircling sealing surface section of the main valve plate, and in which, in particular, the second radially encircling sealing surface section of the main valve plate is released from the radially encircling sealing surface counter-section of the valve housing, thus additionally allowing a flow of the fluid from the fluid source, in particular into the fuel cell stack, via a main opening flow cross section exposed by the main valve plate.

As the valve is opened, the valve is advantageously moved from the closed position, via the pressure compensating position, into the open position. As the valve is closed, the valve is advantageously moved from the open position, via the pressure compensating position, into the closed position. In the open position, the flow of the fluid from the fluid source into the fuel cell stack depends on how far the elongate slide of the valve is moved, in particular raised, in a direction from the second radial projection to the first radially encircling projection along the axial axis of the elongate slide. Consequently, the valve can have a multiplicity of open positions.

A main valve plate, which is mounted movably on the second slide section, has axial play along the axial axis of the elongate slide and radial play with respect to the second slide section. By moving the elongate slide along the axial axis of the elongate slide, a gap can form between the first radially encircling projection and the main valve plate.

The valve housing can comprise an inlet connection opening for connecting a supply line coming from the fluid source and an outlet connection opening for connecting a supply line going to the fuel cell stack. The valve housing can be of one-piece design. It is also possible for the valve housing to be of multi-part, in particular two-part, design. A multi-part valve housing can simplify the arrangement of the valve in the valve housing. In particular, the valve housing can be an angle valve housing. In this way, the flow of a fluid from the fluid source can be controlled in a particularly simple manner.

It is also conceivable for the valve housing to be formed by a supply line, e.g. a supply line for supplying the fuel cell stack with hydrogen or air/oxygen, of the fuel cell system. If the valve housing is a supply line, then it is a particularly simple matter to retrofit a valve in the fuel cell system.

The fuel cell system can have at least one valve in a valve housing. For fluid-communicating connection of the fluid source to the fuel cell stack, the valve can be arranged upstream of the fuel cell stack in the direction of flow of the fluid. The valve can also be arranged downstream of the fuel cell stack in the direction of flow of the fluid. It is also conceivable to arrange a valve upstream of the fuel cell stack in the direction of flow of the fluid and a valve downstream of the fuel cell stack in the direction of flow of the fluid.

The fuel cell system can have an actuator. An actuator can be a solenoid actuator. The solenoid actuator can have a housing, a hollow coil, a plunger core bearing and a plunger core mounted in the plunger core bearing. The hollow coil can form the drive unit. In particular, the plunger core can form at least part of the elongate slide, in particular of the first slide section. By applying a voltage to the hollow coil, a magnetic field is generated, and the plunger core can be moved along the axial axis of the plunger core or of the slide. By means of a solenoid actuator, the valve can advantageously be moved particularly quickly between the positions. It is thereby possible, for example, to reduce a transfer of air/oxygen from a cathode of a fuel cell to an anode of the fuel cell in a particularly advantageous manner. Moreover, the valve can be moved particularly quickly into the open position. The actuator can also be an electric motor having a stator and a rotor, and the stator can form the drive unit together with the rotor. The rotor can have a hollow shaft with an internal thread. In the first slide section, the slide can comprise an external thread corresponding to the internal thread of the hollow shaft and can be mounted in a rotationally secure manner. Thus, by applying a voltage to the stator, a rotational movement can be imparted to the rotor, and, by virtue of the rotationally secure mounting, the slide can be moved along the axial axis of the slide. In a fuel cell system having a valve according to the invention, it is advantageously possible to use a low-torque electric motor. This makes it possible to save installation space and costs.

The elongate slide can have a main body, wherein the second slide section has the first radially encircling projection and the second radial projection in addition to the main body. The elongate slide can have a circular area, in particular a circular ring, as the cross-sectional area. If the elongate slide has a circular ring as the cross-sectional area, material and weight can be saved and the movement of the slide can take place particularly quickly. Furthermore, it can be guided in a particularly advantageous manner in the longitudinal guide of the valve housing. In particular, the elongate slide is a cylindrical elongate slide. In the case of a cylindrical elongate slide, the axis of rotation can be the axial axis. The elongate slide can also have a polygonal area, in particular a quadrilateral area, as the cross-sectional area. A slide having a rectangular cross section can be particularly stable.

The elongate slide can be guided in a longitudinal guide. In particular, the valve housing can have the longitudinal guide. The longitudinal guide can be a linear bearing. The linear bearing can be a linear ball bearing. Advantageously, the linear ball bearing is particularly low in friction and thus allows particularly rapid movement of the elongate slide of the valve along the axial axis of the elongate slide. The linear bearing can also be a linear sliding bearing. The linear sliding bearing advantageously takes up a particularly small installation space and thus the installation space of the valve can also be kept particularly small.

The second slide section can be arranged on the first slide section, in that the second slide section and the first slide section are in one piece. Thus, the elongate slide can be of particularly stable design and can withstand the rapid movement of the elongate slide.

The unit comprising the second slide section and the first radially encircling projection can have a circular area as the cross-sectional area. Such a unit is particularly simple to produce. It is also conceivable for the unit comprising the second slide section and the first radially encircling projection to have a polygonal area, in particular a quadrilateral area. Furthermore, the extent of the first radially encircling projection in relation to the axial axis of the elongate slide can be greater than the extent of the second slide section in relation to the axial axis of the elongate slide. The unit comprising the second slide section and the first radially encircling projection can be formed by forming the second slide section and the first radially encircling projection in one piece. In this way, a particularly high stability of the unit is ensured.

The second radial projection can be a separate component. This means that the second radial projection can be additionally arranged on the end of the elongate slide, for example. The arrangement can take place, for example, by means of a fastening means, such as a screw. In this way, the main valve plate can be mounted in a simple manner on the second slide section such that it can move between the first radially encircling projection and the second radial projection. The second radial projection can also form a unit with the second slide section. The unit comprising the second slide section and the second radial projection can be formed by forming the second slide section and the first radially encircling projection in one piece. In this way, a particularly high stability of the unit is ensured. If the second slide section and the second radial projection are formed in one piece, then the second slide section and the first radially encircling projection cannot be formed in one piece. This ensures that the main valve plate can be mounted in a simple manner on the second slide section such that it can move between the first radially encircling projection and the second radial projection. The second radial projection or the unit comprising the second radial projection and the second slide section can have a circular area as the cross-sectional area. It is also conceivable for the second radial projection or the unit comprising the second radial projection and the second slide section to have a polygonal area, in particular a quadrilateral area. In particular, the second radial projection or the unit comprising the second radial projection and the second slide section can be a radially encircling projection having the apertures. Thus, when the elongate slide of the valve is moved in a direction from the second radial projection to the first radially encircling projection, the main valve plate can be raised particularly smoothly along the axial axis of the elongate slide.

The main valve plate can have a circular area as the cross-sectional area. It is also conceivable for the main valve plate to have a polygonal area, in particular a quadrilateral area. In particular, the unit comprising the second slide section and the first radially encircling projection, the second radial projection and the main valve plate have the same cross-sectional area shape. This makes it possible to produce a particularly simple valve. The slide hole of the main valve plate can be a slide hole arranged centrally in the main valve plate. A centrally arranged slide hole can bring about particularly advantageous mobility of the main valve plate.

In a fuel cell system according to the invention, a possible pressure difference between the two sides of the valve can be particularly advantageously reduced by moving the valve from the closed position into the pressure compensating position, thus enabling the valve to be moved particularly quickly from the closed position into the open position. In a fuel cell system according to the invention, therefore, temporary local differences in a fluid in the fuel cell stack, in particular in the fuel cells, can be particularly advantageously reduced, in particular prevented. The service life of the fuel cells can thus be extended.

In a fuel cell system according to the invention, the first radially encircling projection can advantageously have a radially encircling sealing surface counter-section facing the main valve plate of the valve, wherein the main valve plate has, on the side facing the first radially encircling projection, a first radially encircling sealing surface section for arrangement on the radially encircling sealing surface counter-section of the first radially encircling projection and/or the valve housing has a radially encircling sealing surface counter-section, wherein the main valve plate has, on the side facing away from the first radially encircling projection, a second radially encircling sealing surface section for arrangement on the radially encircling sealing surface counter-section of the valve housing of the fuel cell system. The first radially encircling sealing surface section of the main valve plate and/or the second radially encircling sealing surface section of the main valve plate and/or the radially encircling sealing surface counter-section of the valve housing and/or the radially encircling sealing surface counter-section of the first radially encircling projection can have a radially encircling elevation. Particularly advantageous sealing can thereby be achieved. In particular, the respective radially encircling elevation is formed in one piece with the main valve plate or with the valve housing or with the first radially encircling projection. The radially encircling elevation, for example an encircling nose or lip, can have a semicircular area as the cross-sectional area, for example. If the first radially encircling sealing surface section and/or the second radially encircling sealing surface section of the main valve plate have/has a radially encircling elevation, the radially encircling sealing surface counter-section of the valve housing and/or the radially encircling sealing surface counter-section of the first radially encircling projection are/is preferably flat, although the reverse is, of course, also possible. By means of an elevation, particularly effective sealing can take place when the radially encircling sealing surface counter-section of the first radially encircling projection and the radially encircling sealing surface counter-section of the valve housing press against the first and the second sealing surface section, respectively, of the main valve plate. It is also conceivable for the main valve plate and/or the valve housing and/or the first radially encircling projection to have a radially encircling groove in which the first radially encircling sealing surface section or the second radially encircling sealing surface section and/or the radially encircling sealing surface counter-section of the valve housing and/or the radially encircling sealing surface counter-section of the first radially encircling projection are/is arranged. Furthermore, the first radially encircling sealing surface section of the main valve plate and/or the second radially encircling sealing surface section of the main valve plate and/or the radially encircling sealing surface counter-section of the valve housing and/or the radially encircling sealing surface counter-section of the first radially encircling projection can have or be a radially encircling seal. An elevation can be a seal. The seal can be a static seal. The seal can be a hard, soft and multi-material seal. In particular, the hard-material seal is a metal seal. Metal seals can advantageously be used at a high pressure and/or a high temperature. In particular, the soft-material seal is of resilient design. Thus, the soft-material seal can be rubber, in particular an elastomer, or at least a plastic as the material. Particularly advantageous sealing can be achieved with a soft-material seal. It is thus possible to ensure that the flow of the fluid from the fluid source into the fuel cell stack, particularly in the closed position of the valve, is particularly advantageously interrupted. In other words, leakage can be kept particularly low.

According to a further preferred embodiment, the cross-sectional area of the slide hole in a fuel cell system according to the invention can be greater than the cross-sectional area of the second slide section in the region between the first radially encircling projection and the second radial projection, with the result that a fluid flow channel is formed between the main valve plate and the second slide section in the region between the first radially encircling projection and the second radial projection, wherein the fluid flow channel and the at least one aperture are arranged in a fluid-communicating manner with respect to one another, and wherein the cross-sectional area of the slide hole is less than the cross-sectional area of the unit comprising the second slide section and the first radially encircling projection, and wherein the extent of the second radial projection in relation to the axial axis of the elongate slide is greater than the maximum radial extent of the slide hole of the main valve plate in relation to the axial axis of the elongate slide. It is thereby possible to provide a valve having particularly advantageous sealing properties. Furthermore, the fuel cell system can be operated in a particularly advantageous manner.

It may be advantageous if, in a fuel cell system according to the invention, the extent of the first radially encircling projection in relation to the axial axis of the elongate slide is less than a distance of a contact point of the valve housing with the main valve plate, in particular of the radially encircling sealing surface counter-section of the valve housing, in relation to the axial axis of the elongate slide. It is thereby possible to ensure that the drive unit has to exert particularly little force to move the elongate slide from the closed position into the pressure compensating position, particularly in the event of a pressure difference between the two sides of the valve. At the same time, it is possible to ensure that, in the open position, the valve has a large main opening flow cross section and the fuel cell stack is supplied with sufficient fluid from the fluid source. In particular, the ratio of the extent of the first radially encircling projection in relation to the axial axis of the elongate slide to the distance of the contact point of the valve housing with the main valve plate, in particular to the radially encircling sealing surface counter-section of the valve housing, in relation to the axial axis of the elongate slide, may be 1:2, 1:3, 1:4 or 1:10. Particularly advantageous operation of the fuel cell system is thereby possible.

In a fuel cell system according to the invention, the distance between the first radially encircling projection and the second radial projection of the second slide section can advantageously be in a range of between 101% and 130%, in particular of between 105% and 115%, of the thickness of the main valve plate. Owing to the fact that the main valve plate has a thickness which is less than the distance between the first radially encircling projection and the second radial projection, it is possible, depending on the position of the valve, for a gap to form between the main valve plate and the first radially encircling projection and/or between the main valve plate and the second radial projection. In the pressure compensating position, a gap can form between the main valve plate and the first radially encircling projection. The larger this gap, the lower the flow resistance to which the fluid of the fluid source is subject as it flows through, and pressure compensation can take place particularly quickly. Consequently, it is possible to move the valve into an open position particularly quickly.

In a fuel cell system according to the invention, the cross-sectional area of the slide hole in the main valve plate can particularly advantageously be a value of between 101% and 130%, in particular 105% and 115%, of the cross-sectional area of the second slide section in the region between the first radially encircling projection and the second radial projection. It is thereby possible to ensure that the main valve plate is mounted in a particularly mobile way on the second slide section. Furthermore, it can be ensured that the fluid can particularly advantageously flow through the fluid flow channel between the main valve plate and the second slide section in the region between the first radially encircling projection and the second radial projection, particularly in the pressure compensating position. The valve can thus be moved particularly quickly from the closed position into the open position.

According to a further preferred embodiment, it is possible, in a fuel cell system according to the invention, for the second radial projection to have two apertures, preferably three apertures, particularly preferably four apertures, wherein the apertures are arranged, in particular, radially symmetrically and/or adjacent apertures are spaced apart from one another, in particular by the same distance. An aperture can also be understood to mean a cutout. If the second radial projection has two apertures, the second radial projection can have the shape of a two-bladed propeller. If the second radial projection has three apertures, then the second radial projection can have the shape of a three-bladed propeller, etc. The second radial projection in the form of the three-bladed propeller can make possible the particularly smooth movement of the valve into the open position. It is also possible for the second radial projection to be designed as a perforated plate. The perforated plate can be produced in a particularly simple manner.

A fuel cell system according to the invention can advantageously have a spring surrounding the elongate slide between a spring arrangement section of the valve housing and a side of the first radially encircling projection which faces away from the main valve plate. In particular, the spring surrounds at least part of the first slide section of the elongate slide. By means of the spring, the movement of the elongate slide in a direction from the first radially encircling projection to the second radial projection along the axial axis of the elongate slide can be assisted particularly advantageously. Thus, the movement of the valve from the open position into the closed position can take place in a particularly short time. The spring can be a wave spring. Advantageously, wave springs require particularly little installation space and can at the same time generate a high force. The spring can also be a conical spring or barrel spring. The coils of the conical spring and of the barrel spring can drop into one another when compressed, and thus the movement of the elongate slide in a direction from the second radial projection to the first radially encircling projection along the axial axis of the elongate slide can take place particularly easily and over a long distance. This means that, in the open position of the valve, the main opening flow cross section exposed by the main valve plate can be particularly large. Consequently, the fuel cell system can be operated in a particularly advantageous manner.

According to a further preferred embodiment, in a fuel cell system according to the invention, the main valve plate and/or the second slide section can have at least one spacer between the main valve plate and the second slide section. By means of the at least one spacer, the radial movement of the main valve plate can be minimized in a particularly advantageous manner. At the same time, the axial movement of the main valve plate can be retained. In particular, the at least one spacer is designed in such a way that the fluid flow channel between the main valve plate and the second slide section in the region between the first radially encircling projection and the second radial projection is influenced as little as possible. The at least one spacer can extend in the form of a pin between the lateral surface of the second slide section and the inner lateral surface of the main valve plate. In particular, the main valve plate and/or the second slide section have/has three equidistant spacers between the main valve plate and the second slide section. As a result, the radial movement of the main valve plate can be minimized in a particularly advantageous manner. Advantageously, the at least one spacer is formed by balls. For example, the second slide section can have balls and can form a kind of ball cage. As a result, the main valve plate can be moved axially in a particularly simple and smooth manner and, at the same time, the radial movement can be kept small.

It may be advantageous if, in a fuel cell system according to the invention, in the second slide section, in the region between the end of the elongate slide and the first radially encircling projection, the elongate slide has a throughflow channel along the axial axis of the elongate slide, and in that the elongate slide has at least one transverse channel, which is connected in a fluid-communicating manner to the throughflow channel, to the lateral surface of the elongate slide in the region between the first radially encircling projection and the second radial projection, in order to pass through the fluid of the fluid source. The flow of the fluid from the fluid source into the fuel cell stack can thereby be increased, in particular advantageously increased in the pressure compensating position, and at least partial pressure compensation can take place particularly quickly, thus enabling the valve to be moved particularly quickly into the open position. The flow channel can be a drill hole. The at least one transverse channel can also be a drill hole. Drill holes can be produced particularly quickly and simply.

One particularly advantageous possibility in a fuel cell system according to the invention is for the valve housing and/or the elongate slide to have a stop for fixing an end position of the elongate slide in an open position of the valve. By fixing an end position, it is possible in a particularly simple manner to prevent the drive unit from being overloaded. It is also possible to prevent the valve from being damaged. The stop can be formed by the longitudinal guide. Furthermore, the stop can be formed in one piece with the valve housing and/or the elongate slide. It is also possible for the stop to be formed in one piece with the valve housing and, furthermore, to be designed in the form of a sleeve around the slide. This enables the slide to support the guidance by the longitudinal guide in a particularly advantageous manner. It is also conceivable for the first radially encircling projection to have the stop on the side facing away from the main valve plate and to press against the valve housing in the end position. It is a particularly simple matter for such a stop to be formed by means of the first radially encircling projection.

According to a second aspect, the present invention shows a method for controlling the flow of a fluid from a fluid source into or out of the fuel cell stack of a fuel cell system according to the invention, the method, starting from a closed position of the valve, having the following steps:
  a) activation of the drive unit by the control unit so that the drive unit applies a driving force to the elongate slide,
  b) activation of the drive unit by the control unit in order to increase the driving force until it is greater than a first closing force of the first radially encircling projection counteracting the driving force, with the result that the slide is moved from the closed position into a pressure compensating position,
  c) activation of the drive unit by the control unit in order to increase the driving force until it is greater than a closing force of the main valve plate counteracting the driving force together with an opposing second closing force of the first radially encircling projection, with the result that the valve is moved from the pressure compensating position into an open position,
  d) activation of the drive unit by the control unit in order to maintain the driving force to hold the valve in this open position or in order to increase the driving force to move the valve into a further open position and increase the flow of the fluid from the fluid source into or out of the fuel cell stack,
  e) activation of the drive unit by the control unit in order to move the valve from the open position or the further open position, via the pressure compensating position, back into the closed position.

A closing force can be understood to be a force due to a pressure difference on the two sides of the valve. A closing force can also be understood to mean a force which is applied by a mechanical component, such as a spring. Several forces can also be added to form a closing force. This means that, on the one hand, a closing force due to a pressure difference on the two sides of the valve can be exerted on the first radially encircling projection of the slide, for example, and, on the other hand, a closing force due to a spring can additionally be exerted on the first radially encircling projection. Consequently, in step b), for example, the driving force applied must be greater than the closing force due to the pressure difference together with the closing force due to the spring in order to move the slide from the closed position into a pressure compensating position.

The method according to the second aspect of the invention therefore has the same advantages as have already been described for the fuel cell system according to the first aspect of the invention.

Further measures that improve the invention will become apparent from the following description of a number of exemplary embodiments of the invention, which are illustrated schematically in the figures. All the features and/or advantages which emerge from the claims, the description or the drawings, including design details and spatial arrangements and method steps, may be essential to the invention either per se or in various combinations. It should be noted here that the figures have only a descriptive character and are not intended to restrict the invention in any form.

BRIEF DESCRIPTION OF THE DRAWINGS

The figures are schematic

DETAILED DESCRIPTION

In the following figures, identical reference signs are used for the same technical features, even of different exemplary embodiments.

Figure 1:
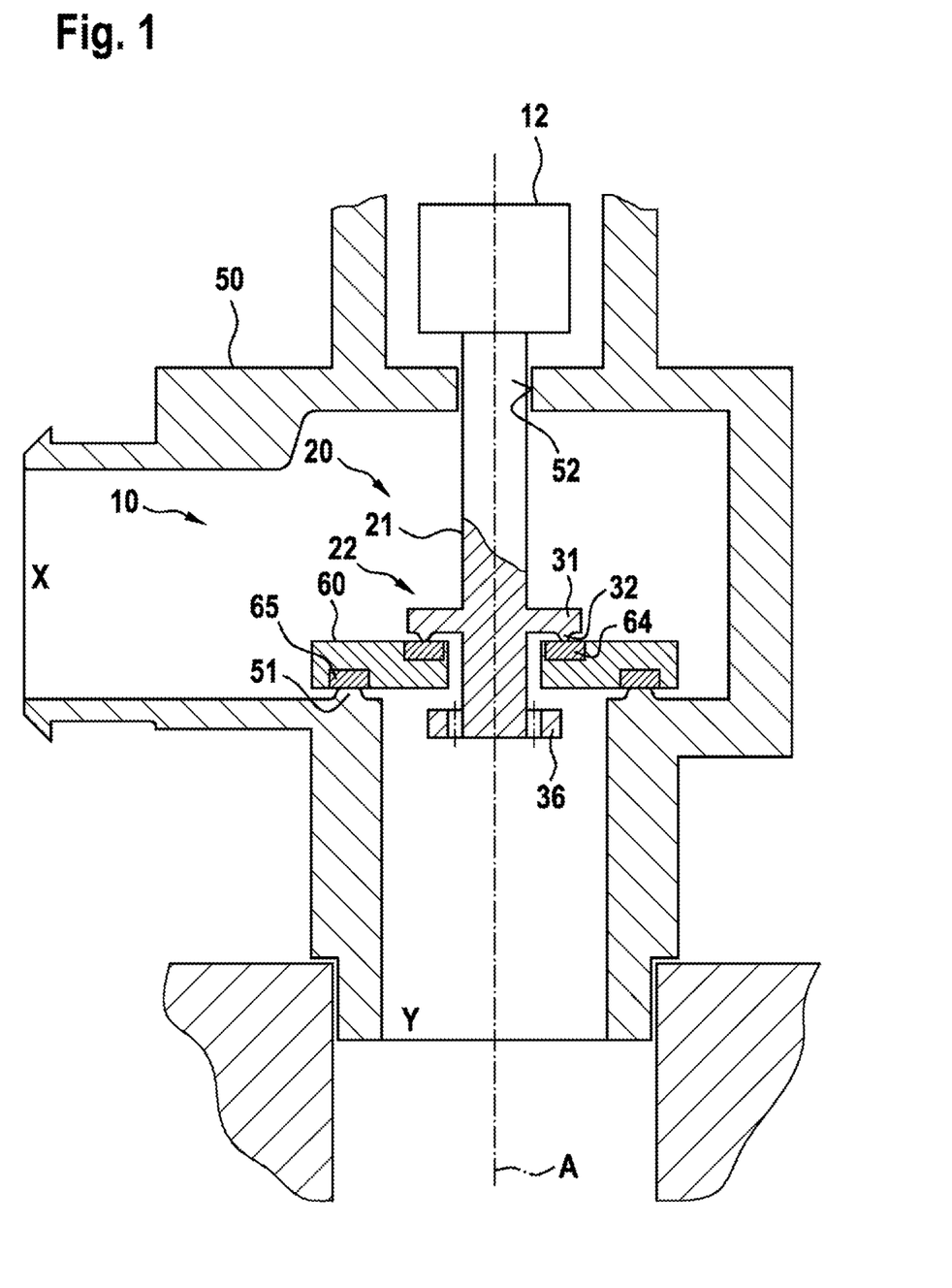
FIG. 1 shows a cross section of a valve in a valve housing, wherein the valve has been moved into the closed position.
Figure 2:
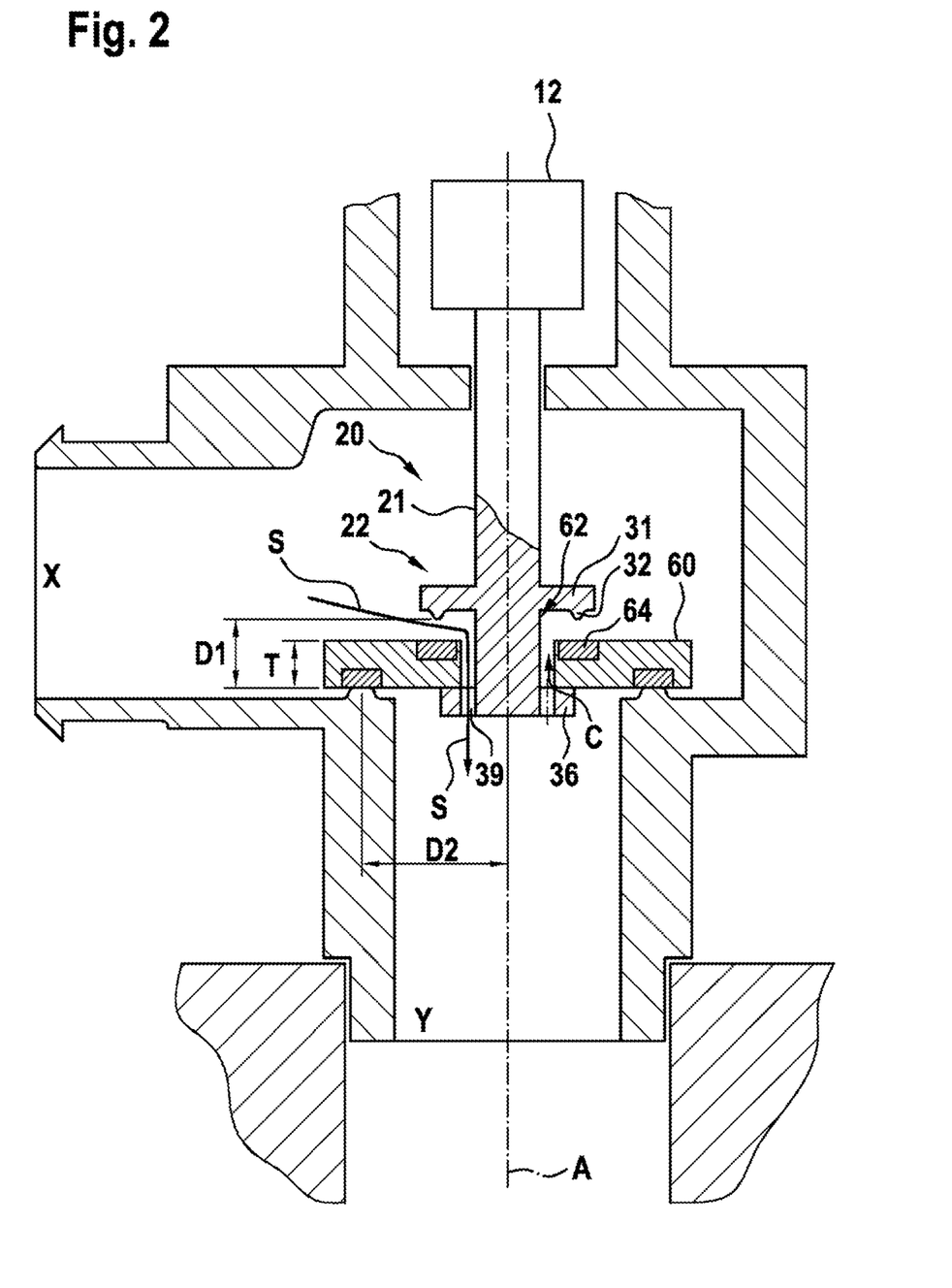
FIG. 2 shows a cross section of a valve in a valve housing, wherein the valve has been moved into the pressure compensating position.
Figure 3:
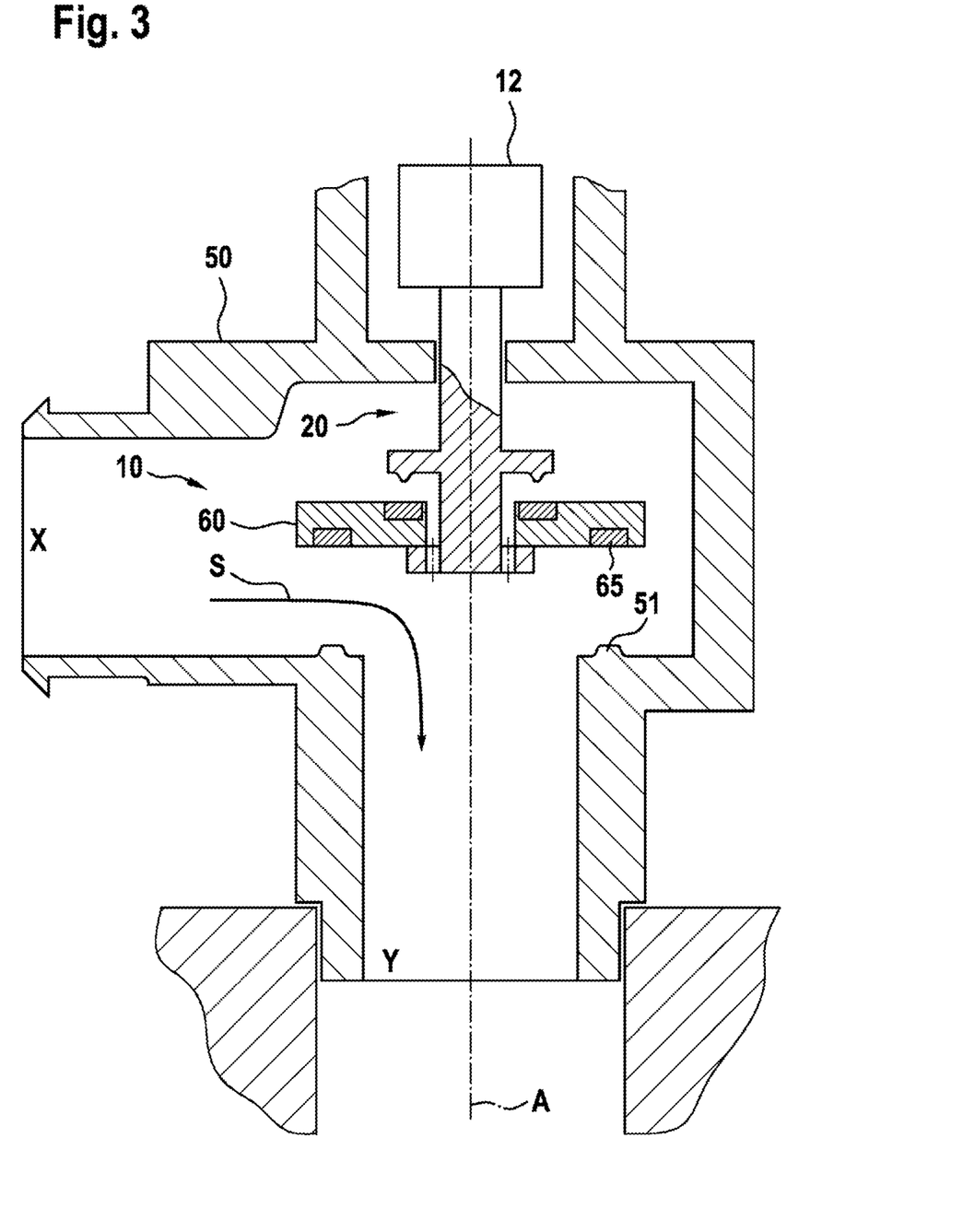
FIG. 3 shows a cross section of a valve in a valve housing, wherein the valve has been moved into the open position.

FIGS. 1 to 3 each show a cross section through a valve 10 in a valve housing 50 of an exemplary embodiment of a fuel cell system 200 according to the invention. FIG. 1 shows the valve in a closed position, FIG. 2 shows it in a pressure compensating position, and FIG. 3 shows it in an open position.

As shown in FIG. 1, the valve 10 is arranged in the valve housing 50, wherein the housing has an inlet connection opening X and an outlet connection opening Y. The valve 10 and the valve housing 50 form what is referred to as an angle valve. In FIG. 1, the valve has been moved into the closed position. When switching off the fuel cell system 200, for example, a drive unit 12 can be activated by a control unit and, by moving the slide 20 in a direction from the first radially encircling projection 31 to the second radial projection 36 along the axial axis A of the slide 20, can move the valve 10 from the open position into the closed position. In the closed position, a flow of a fluid from a fluid source 102 from the inlet connection opening X to the outlet connection opening Y is largely, in particular completely, interrupted. The slide 20 comprises a first slide section 21, which is guided in a slide guide 52, and a second slide section 22, wherein the second slide section 22 has a first radially encircling projection 31 and a second radial projection 36 in addition to the main body.

In the closed position, a radially encircling sealing surface counter-section 32 of the first radially encircling projection 31, which section is here designed as an elevation, presses against the first radially encircling sealing surface section 64 of the main valve plate 60. A second radially encircling sealing surface section 65 in turn presses against a radially encircling sealing surface counter-section 51 of the housing 50. The sealing surface counter-section 51 is likewise designed as an elevation. A particularly advantageous sealing effect can be achieved in the closed position of the valve by means of the radially encircling sections 31, 32, 51, 64 and 65.

In FIG. 2, the valve has been moved into the pressure compensating position. From the closed position, as illustrated in FIG. 1, the valve 10 can be moved into the pressure compensating position by the drive unit 12 moving the slide 20 in a direction from the second radial projection 36 to the first radially encircling projection 31 along the axial axis A of the slide 20. This movement can be accomplished in a particularly simple manner since the extent of the first radially encircling projection 31 in relation to the axial axis A of the elongate slide 20 is less than a distance D2 of the radially encircling sealing surface counter-section 51 of the valve housing 50 in relation to the axial axis A of the elongate slide 20. Consequently, the radially encircling sealing surface counter-section 32 is released from the first radially encircling sealing surface section 64, and a gap is formed between the first radially encircling projection 31 and the main valve plate 64. This gap can form since the thickness T of the main valve plate 64 is less than the distance D1 between the first radially encircling projection 31 and the second radial projection 36. Advantageously, the fluid can now flow from the inlet connection opening X to the outlet connection opening Y via the gap, via a fluid flow channel C, which is formed between the movably mounted main valve plate 60 and the second slide section 22 in the region between the first radially encircling projection 31 and the second radial projection 36, and via apertures 39 in the second radial projection. The flow of the fluid is indicated schematically by S. In this way, a first pressure compensation between the two sides of the valve 10 can be made possible in a particularly simple manner. As a result, the main valve plate 60 can now be raised in a simplified manner, i.e. with a low force, and the valve 10 can be moved into the open position. This can be advantageous, for example, in a cathode gas path from a fluid source 102 to a fuel cell stack 100 of the fuel cell system 200, in which pressurized air is present at the input connection X and a lower pressure, e.g. ambient pressure, is present at the output connection Y.

In FIG. 3, the valve 10 has been moved into the open position. From the pressure compensating position, as illustrated in FIG. 2, the valve 10 can be moved into the open position by the drive unit 12 moving, in particular raising, the slide 20 further in a direction from the second radial projection 36 to the first radially encircling projection 31 along the axial axis A of the slide 20. As a result of the preceding pressure compensation, the raising of the main valve plate 60 can take place with a lower force than if a drive unit had to raise a slide with only one main valve plate, i.e. without pressure compensation. The second radially encircling sealing surface section 65 of the main valve plate 60 is released from the radially encircling sealing surface counter-section 51 of the valve housing 50, with the result that, in addition, a flow S of the fluid from the fluid source 102, for example into the fuel cell stack 100, is possible from the inlet connection X to the outlet connection Y via a main opening flow cross section exposed by the main valve plate 60.

Figure 4:
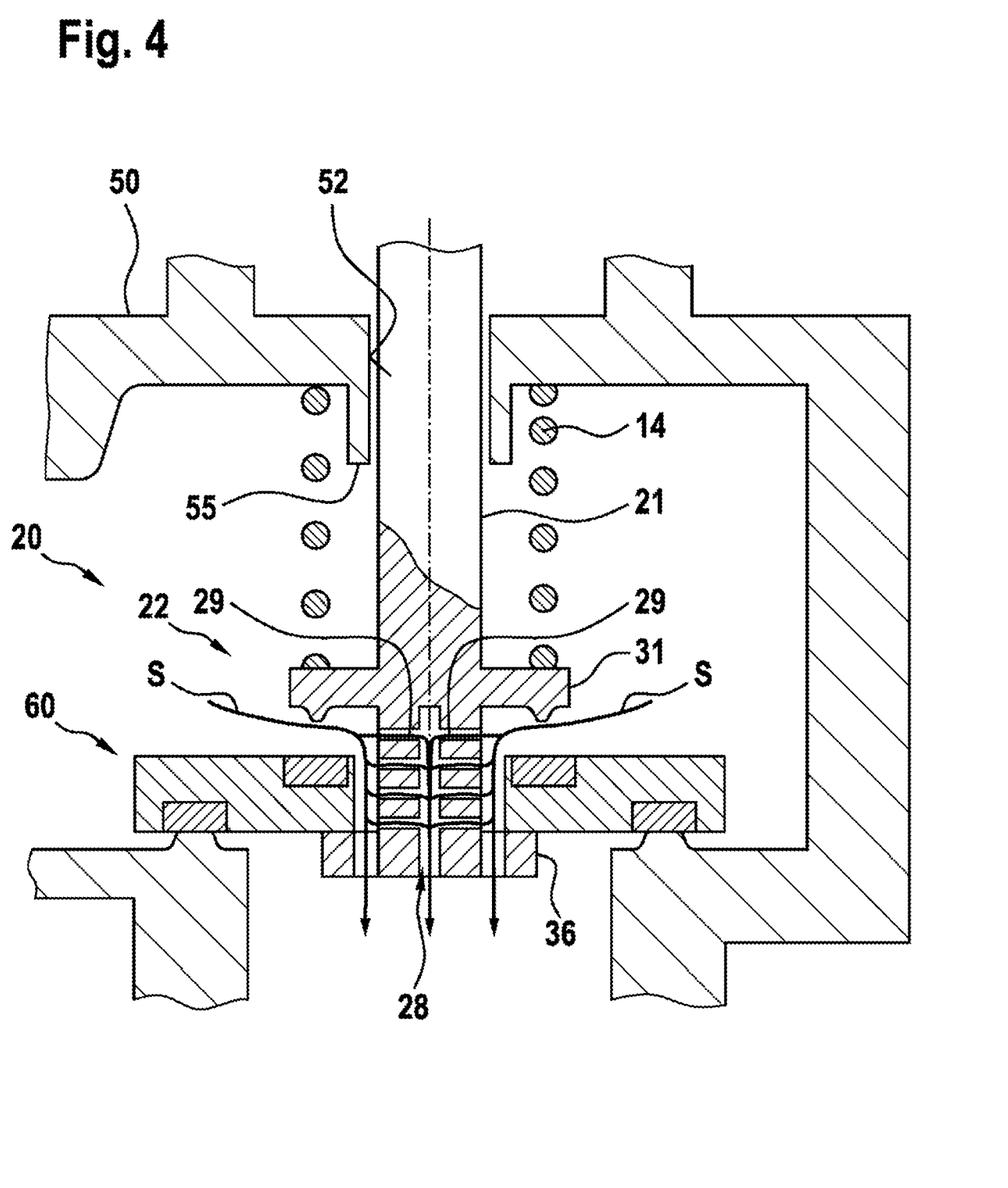
FIG. 4 shows a cross section of a valve in a valve housing, wherein the valve has been moved into the pressure compensating position.

FIG. 4 shows a cross section through a valve 10 in a valve housing 50 of another exemplary embodiment of a fuel cell system 200 according to the invention. For the sake of clarity, only part of the valve 10 and of the valve housing 50 is shown. As regards the remaining components (not illustrated), such as the drive unit 12, reference is made to FIGS. 1 to 3. In FIG. 4, the valve has been moved into a pressure compensating position. In the second slide section 22, the elongate slide 20 additionally has a through flow channel 28 along the axial axis A of the elongate slide 20 in the region between the end of the elongate slide 20 and the first radially encircling projection 31. In this case, the elongate slide further comprises a plurality of transverse channels 29 which are arranged one above the other and are spaced apart from one another and are connected in a fluid-communicating manner to the through flow channel 28. The combination of the through flow channel 28 and the transverse channels 29 further simplifies passage of a fluid from a fluid source 102. By means of these channels, the flow resistance undergone by the fluid can be reduced. As a result, pressure compensation by means of the flow S of the fluid can take place particularly quickly, and the valve 10 can be moved particularly quickly into the open position. Furthermore, FIG. 4 shows a stop 55, which fixes an end position of the valve in the open position. Here, the stop 55 is formed integrally with the valve housing 50 and forms part of the longitudinal guide 52. Furthermore, FIG. 4 illustrates a spring 14 surrounding at least part of the first slide section 21 of the elongate slide 20. By means of the spring 14, the movement of the elongate slide 20 and thus the movement of the valve 10 from the open position back into the closed position can take place in a particularly short time. Moreover, a particularly advantageous sealing effect can be ensured in the closed position of the valve by means of the spring 14.

Figure 5:
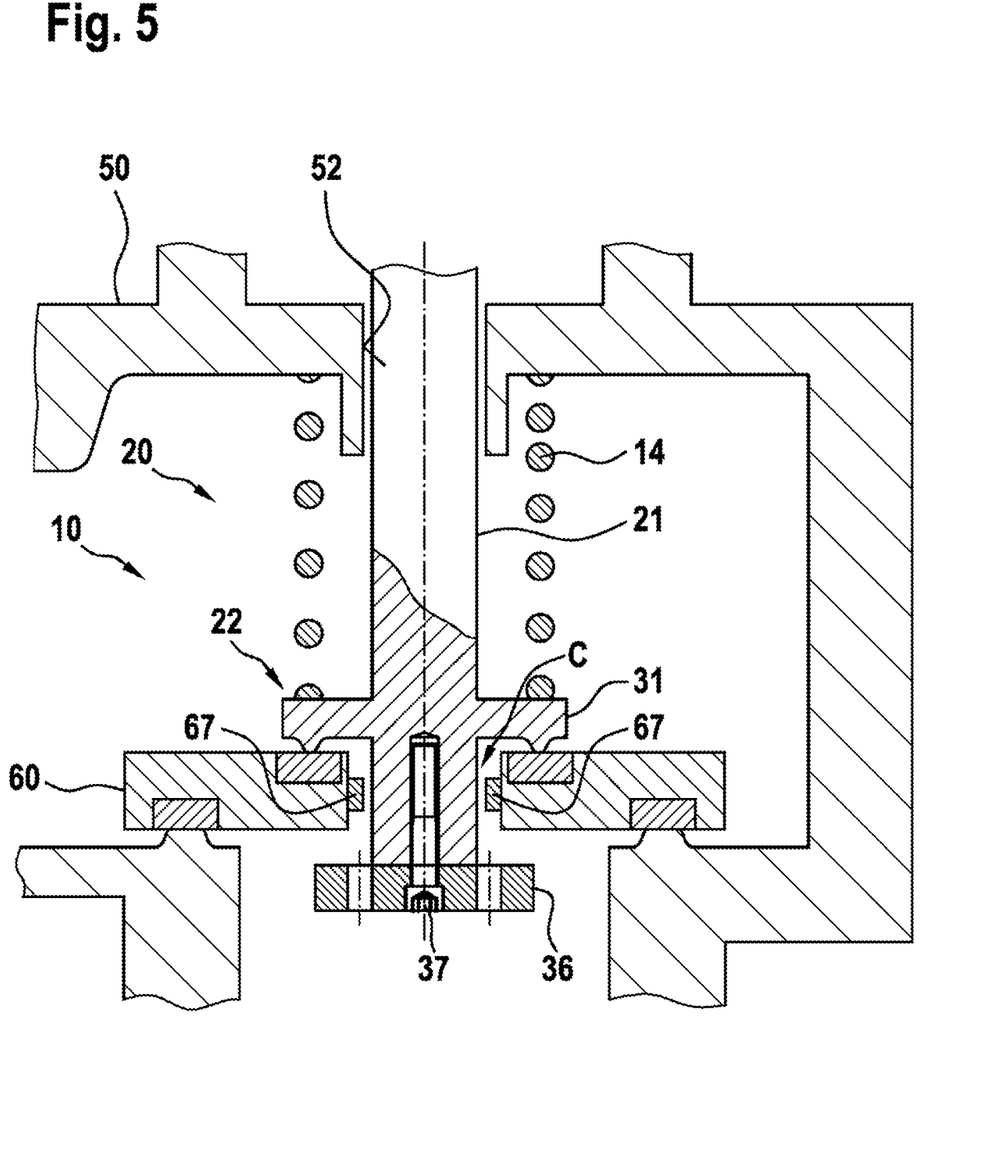
FIG. 5 shows a cross section of a valve in a valve housing, wherein the valve has been moved into the closed position.

FIG. 5 shows a cross section through a valve 10 in a valve housing 50 of a further exemplary embodiment of a fuel cell system 200 according to the invention. In FIG. 5, the main valve plate 60 has a first pin-shaped spacer 67 on the inner lateral surface of the main valve plate 67 and a second pin-shaped spacer 67 located opposite the first pin-shaped spacer 67. By means of the two spacers 67, the radial movement of the main valve plate 60 can be minimized in a particularly advantageous manner. At the same time, the axial movement of the main valve plate 60 can be retained. The two pin-shaped spacers 67 only slightly affect the fluid flow channel C between the main valve plate 60 and the second slide section 22 in the region between the first radially encircling projection 31 and the second radial projection 36, and therefore pressure compensation in the pressure compensating position is still possible. In FIG. 5, the second radial projection 36 is a separate component. The second radial projection 36, in particular the disk-shaped second radial projection 36, is arranged on the end of the elongate slide 20 by means of a screw 37.

Figure 6:
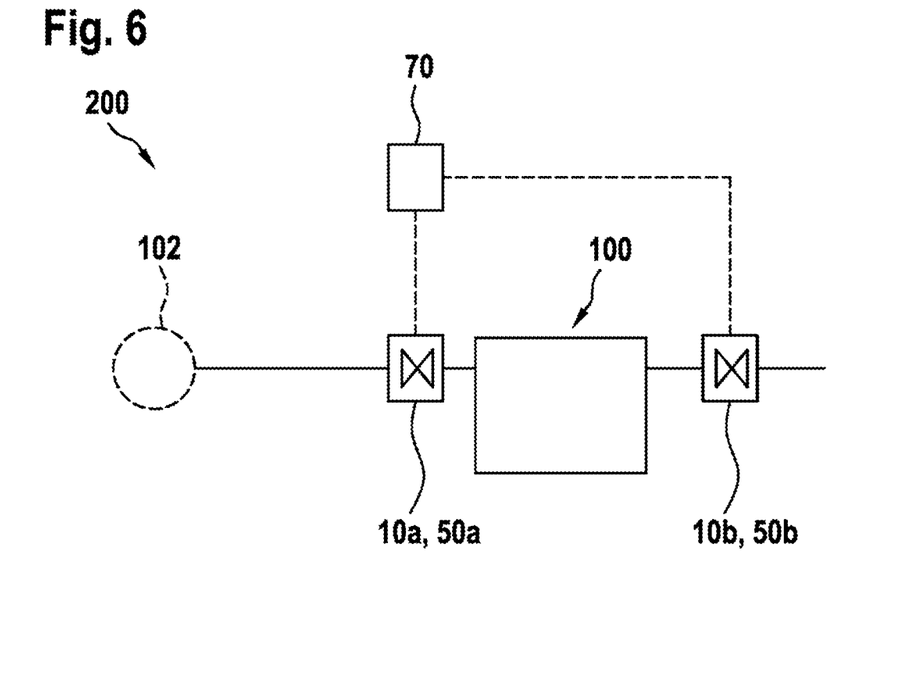
FIG. 6 shows a fuel cell system according to the invention.

FIG. 6 shows a fuel cell system 200 according to the invention having a fluid source 102, a valve 10a arranged upstream of a fuel cell stack 100 in a valve housing 50a, a valve 10b arranged downstream of the fuel cell stack 100 in a valve housing 50b, and having a control unit 70 which can actuate a drive unit 12 of the valve 10a and 10b. The valves 10a and 10b are preferably arranged in a cathode gas path of the fuel cell system 200. With the valves 10a and 10b arranged in the cathode gas path, i.e. in the air flow (air/oxygen), damage due to an air/air start, for example, can be reduced, in particular prevented.

Figure 7:
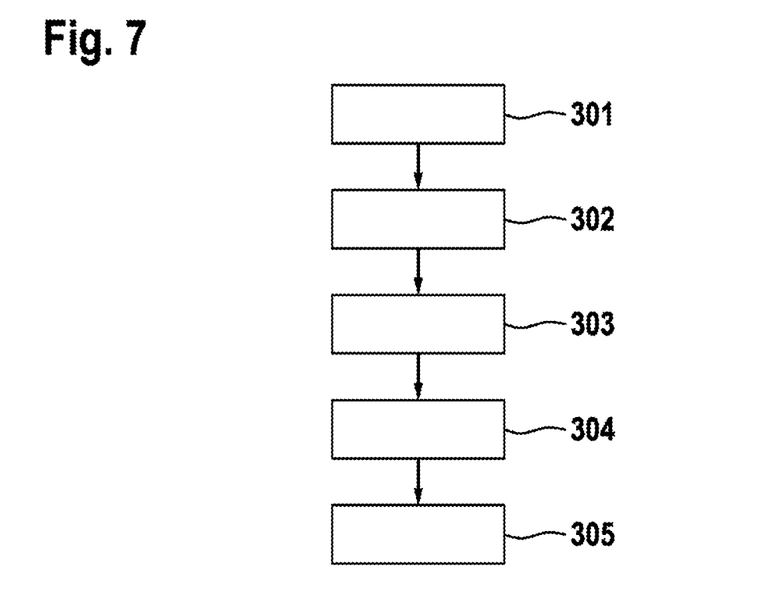
FIG. 7 shows a method according to the invention.

FIG. 7 shows a method according to the invention. Here, the valve 10 is initially in a closed position. In step 301, the drive unit 12 is activated by the control unit 70, and a driving force is applied to the elongate slide. In step 302, the drive unit is activated by the control unit 70 in such a way that the driving force is increased until it is greater than the counteracting closing force of the first radially encircling projection 31. When the driving force is greater than this closing force, the valve 10 is moved, in particular raised, from the closed position into a pressure compensating position. In the pressure compensating position, an at least partial, in particular total, pressure compensation can now take place between the two sides of the valve 10. The two sides of the valve 10 can be understood to comprise the region of an inlet connection opening X and the region of an outlet connection opening Y. In a step 303, the drive unit 12 is now activated by the control unit 70 in such a way that the driving force is increased until the driving force is greater than a closing force of the main valve plate 60 counteracting the driving force, together with an opposing second closing force of the first radially encircling projection 31. If this is the case, the valve 10 is moved, in particular raised, from the pressure compensating position into a first open position. In step 304, the drive unit is activated by the control unit 70 in such a way that the driving force is either held and the valve 10 remains in the first open position or the driving force is increased and the valve 10 can be moved, in particular raised, into a further, in particular second, open position, and the flow rate of the fluid can be increased. Activation of the drive unit 12 by means of the control unit 70 thus permits control of the flow of the fluid from the fluid source 102 into or out of the fuel cell stack 100. In step 305, the drive unit 12 is activated by the control unit 70 in such a way that the valve 10 is moved from an open position, e.g. the first open position, via the pressure compensating position back into the closed position. For example, the driving force can be reduced to zero, and a spring 14 surrounding the elongate slide 20 moves the valve 10 back into the closed position.

The invention claimed is:

1. A fuel cell system (200) having a fuel cell stack (100), wherein the fuel cell stack (100) has a plurality of fuel cells, having a valve housing (50) for fluid-communicating connection of a fluid source (102) to the fuel cell stack, wherein a valve (10) for controlling a flow of a fluid from the fluid source (102) into or out of the fuel cell stack (100) is arranged in the valve housing (50), wherein the valve (10) has:
  a) a drive unit (12), which is configured to be driven by a control unit (70) in order to move an elongate slide (20) of the valve (10) along an axial axis (A) of the elongate slide (20),
  b) the elongate slide (20) with a first slide section (21) and a second slide section (22), which is arranged on the first slide section (21), wherein the second slide section (22) has:
    i. a first radially encircling projection (31),
    ii. a second radial projection (36), which is spaced at a distance (D1) from the first radially encircling projection (31) and has at least one aperture (39) for the passage of the fluid from the fluid source (102),
    iii. a main valve plate (60), which is mounted movably on the second slide section (22) between the first radially encircling projection (31) and the second radial projection (36) and has a slide hole (62), wherein the main valve plate (60) has a thickness (T) which is less than the distance (D1) between the first radially encircling projection (31) and the second radial projection (36).

2. The fuel cell system (200) as claimed in claim 1, wherein the first radially encircling projection (31) has a radially encircling sealing surface counter-section (32) facing the main valve plate (60) of the valve (10), wherein the main valve plate (60) has, on the side facing the first radially encircling projection (31), a first radially encircling sealing surface section (64) for arrangement on the radially encircling sealing surface counter-section (32) of the first radially encircling projection (31) and/or the valve housing has a radially encircling sealing surface counter-section (51), wherein the main valve plate (60) has, on the side facing away from the first radially encircling projection (31), a second radially encircling sealing surface section (65) for arrangement on the radially encircling sealing surface counter-section (51) of the valve housing (50) of the fuel cell system (200).

3. The fuel cell system (200) as claimed in claim 1, wherein
  the cross-sectional area of the slide hole (62) is greater than the cross-sectional area of the second slide section (22) in the region between the first radially encircling projection (31) and the second radial projection (36), such that a fluid flow channel (C) is formed between the main valve plate (60) and the second slide section (22) in the region between the first radially encircling projection (31) and the second radial projection (36), wherein the fluid flow channel (C) and the at least one aperture (39) are arranged in a fluid-communicating manner with respect to one another,
  and the cross-sectional area of the slide hole (62) is less than the cross-sectional area of a unit comprising the second slide section (22) and the first radially encircling projection (31),
  and an extent of the second radial projection (36) in relation to the axial axis (A) of the elongate slide (20) is greater than a maximum radial extent of the slide hole (62) of the main valve plate (60) in relation to the axial axis (A) of the elongate slide (20).

4. The fuel cell system (200) as claimed in claim 1, wherein an extent of the first radially encircling projection (31) in relation to the axial axis (A) of the elongate slide (20) is less than a distance (D2) of a contact point of the valve housing (50) with the main valve plate (60) in relation to the axial axis (A) of the elongate slide (20).

5. The fuel cell system (200) as claimed in claim 1, wherein the distance (D1) between the first radially encircling projection (31) and the second radial projection (36) of the second slide section (22) is in a range of between 101% and 130% of the thickness (T) of the main valve plate (60).

6. The fuel cell system (200) as claimed in claim 1, wherein the cross-sectional area of the slide hole (62) in the main valve plate (60) is a value of between 101% and 130% of the cross-sectional area of the second slide section (22) in a region between the first radially encircling projection (31) and the second radial projection (36).

7. The fuel cell system (200) as claimed in claim 1, wherein the second radial projection (36) has two apertures (39a, 39b), wherein the apertures (39) are arranged radially symmetrically and/or adjacent apertures (39) are spaced apart from one another by the same distance.

8. The fuel cell system (200) as claimed in claim 1, wherein the fuel cell system (200) has a spring (14) surrounding the elongate slide (20) between a spring arrangement section of the valve housing (50) and a side of the first radially encircling projection (31) which faces away from the main valve plate (60).

9. The fuel cell system (200) as claimed in claim 1, wherein the main valve plate (60) and/or the second slide section (22) has spacers (67) between the main valve plate (60) and the second slide section (22).

10. The fuel cell system (200) as claimed in claim 1, wherein, in the second slide section (22), in a region between the end of the elongate slide (20) and the first radially encircling projection (31), the elongate slide (20) has a throughflow channel (28) along the axial axis (A) of the elongate slide (20), and in that the elongate slide (20) has at least one transverse channel (29), which is connected in a fluid-communicating manner to the throughflow channel (28), to a lateral surface of the elongate slide (20) in a region between the first radially encircling projection (31) and the second radial projection (36), in order to allow passage therethrough of the fluid of the fluid source (102).

11. A method for controlling the flow of a fluid from a fluid source (102) into or out of the fuel cell stack (100) of a fuel cell system (200) according to claim 1, the method, starting from a closed position of the valve (10), having the following steps:
  a) activation (301) of the drive unit (12) by the control unit (70) so that the drive unit (12) applies a driving force to the elongate slide (20),
  b) activation (302) of the drive unit (12) by the control unit (70) in order to increase the driving force until the driving force is greater than a first closing force of the first radially encircling projection (31) counteracting the driving force, such that the valve (10) is moved from the closed position into a pressure compensating position,
  c) activation (303) of the drive unit (12) by the control unit (70) in order to increase the driving force until the driving force is greater than a closing force of the main valve plate (60) counteracting the driving force together with an opposing second closing force of the first radially encircling projection (31), such that the valve (10) is moved from the pressure compensating position into an open position,
  d) activation (304) of the drive unit (12) by the control unit (70) in order to maintain the driving force to hold the valve (10) in this open position or in order to increase the driving force to move the valve (10) into a further open position and increase the flow of the fluid from the fluid source (102) into or out of the fuel cell stack (100),
  e) activation (305) of the drive unit (12) by the control unit (70) in order to move the valve (10) from the open position or the further open position, via the pressure compensating position, back into the closed position.

12. The fuel cell system (200) as claimed in claim 4, wherein the contact point of the valve housing (50) with the main valve plate (60) is a radially encircling sealing surface counter-section (51) of the valve housing (50).

13. The fuel cell system (200) as claimed in claim 5, wherein the distance (D1) between the first radially encircling projection (31) and the second radial projection (36) of the second slide section (22) is in a range of between 105% and 115% of the thickness (T) of the main valve plate (60).

14. The fuel cell system (200) as claimed in claim 6, wherein the cross-sectional area of the slide hole (62) in the main valve plate (60) is a value of between 105% and 115% of the cross-sectional area of the second slide section (22) in a region between the first radially encircling projection (31) and the second radial projection (36).

15. The fuel cell system (200) as claimed in claim 1, wherein the second radial projection (36) has three apertures (39a, 39b, 39c), wherein the apertures (39) are arranged radially symmetrically and/or adjacent apertures (39) are spaced apart from one another by the same distance.

16. The fuel cell system (200) as claimed in claim 1, wherein the second radial projection (36) has four apertures (39a, 39b, 39c, 39d), wherein the apertures (39) are arranged radially symmetrically and/or adjacent apertures (39) are spaced apart from one another by the same distance.

* * * * *